United States Patent [19]
Engalitcheff, Jr. et al.

[11] 3,767,176
[45] Oct. 23, 1973

[54] INJECTOR TYPE COOLING TOWER

[75] Inventors: John Engalitcheff, Jr., Gibson Island; Wilson E. Bradley, Jr., Ellicott City; Edward N. Schinner, Silver Spring, all of Md.

[73] Assignee: Baltimore Aircoil Company, Inc., Baltimore, Md.

[22] Filed: Oct. 27, 1969

[21] Appl. No.: 869,798

[52] U.S. Cl............ 261/111, 261/116, 261/DIG. 11, 261/DIG. 54, 55/259
[51] Int. Cl............................................... B01f 5/20
[58] Field of Search................... 55/257, 259, 440; 239/601; 261/104–108, 113, 111, 116, 261/DIG. 11, DIG. 54

[56] References Cited
UNITED STATES PATENTS

| | | | |
|---|---|---|---|
| 1,972,001 | 8/1934 | Witham, Jr. et al. | 239/601 X |
| 2,032,404 | 3/1936 | Fisher | 261/116 |
| 2,774,631 | 12/1956 | Wahlin | 239/601 X |
| 2,778,687 | 1/1957 | Hegstad | 239/601 |
| 3,406,953 | 10/1968 | Moore | 261/116 X |
| 3,142,548 | 7/1964 | Krantz | 261/DIG. 54 |
| 3,285,156 | 11/1966 | Bohanon | 55/440 |
| 3,304,696 | 2/1967 | McKenna | 55/440 |
| 3,360,906 | 1/1968 | Parkinson | 261/DIG. 11 |

FOREIGN PATENTS OR APPLICATIONS

| | | | |
|---|---|---|---|
| 45,132 | 3/1960 | Poland | 261/DIG. 54 |
| 718,487 | 11/1954 | Great Britain | 261/116 |

Primary Examiner—Frank W. Lutter
Assistant Examiner—Steven H. Markowitz
Attorney—Stevens, Davis, Miller & Mosher

[57] ABSTRACT

An injection type cooling tower, the basic module of which is made up of an injector and an exhaust stack which are made in interfitting relationship with common walls and also injection type cooling towers which have the axis of fluid flow disposed horizontally or inverted.

1 Claim, 8 Drawing Figures

INVENTORS
JOHN ENGALITCHEFF, JR.
WILSON E. BRADLEY, JR.
EDWARD N. SCHINNER

BY Stevens, Davis, Miller & Mosher
ATTORNEYS

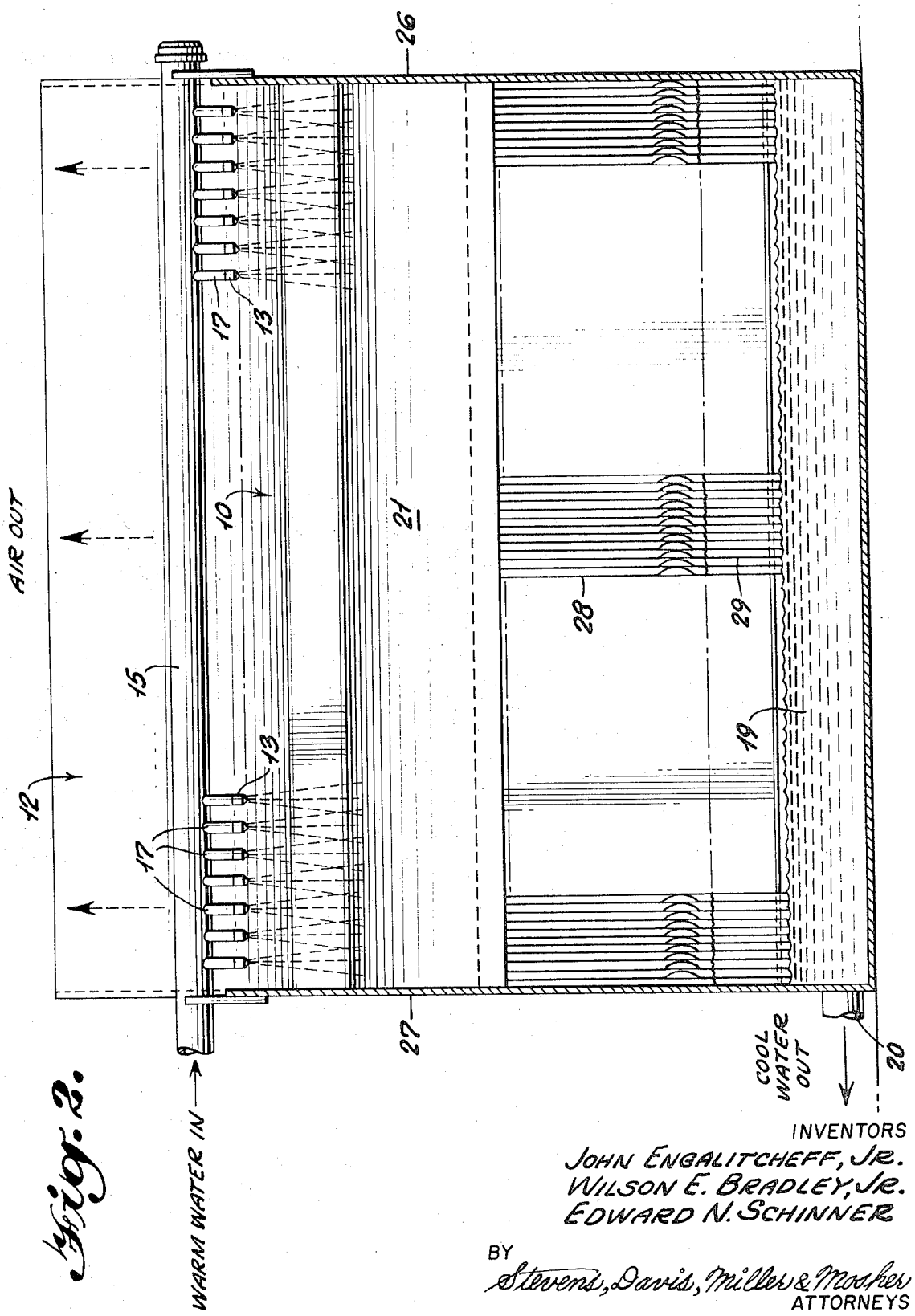

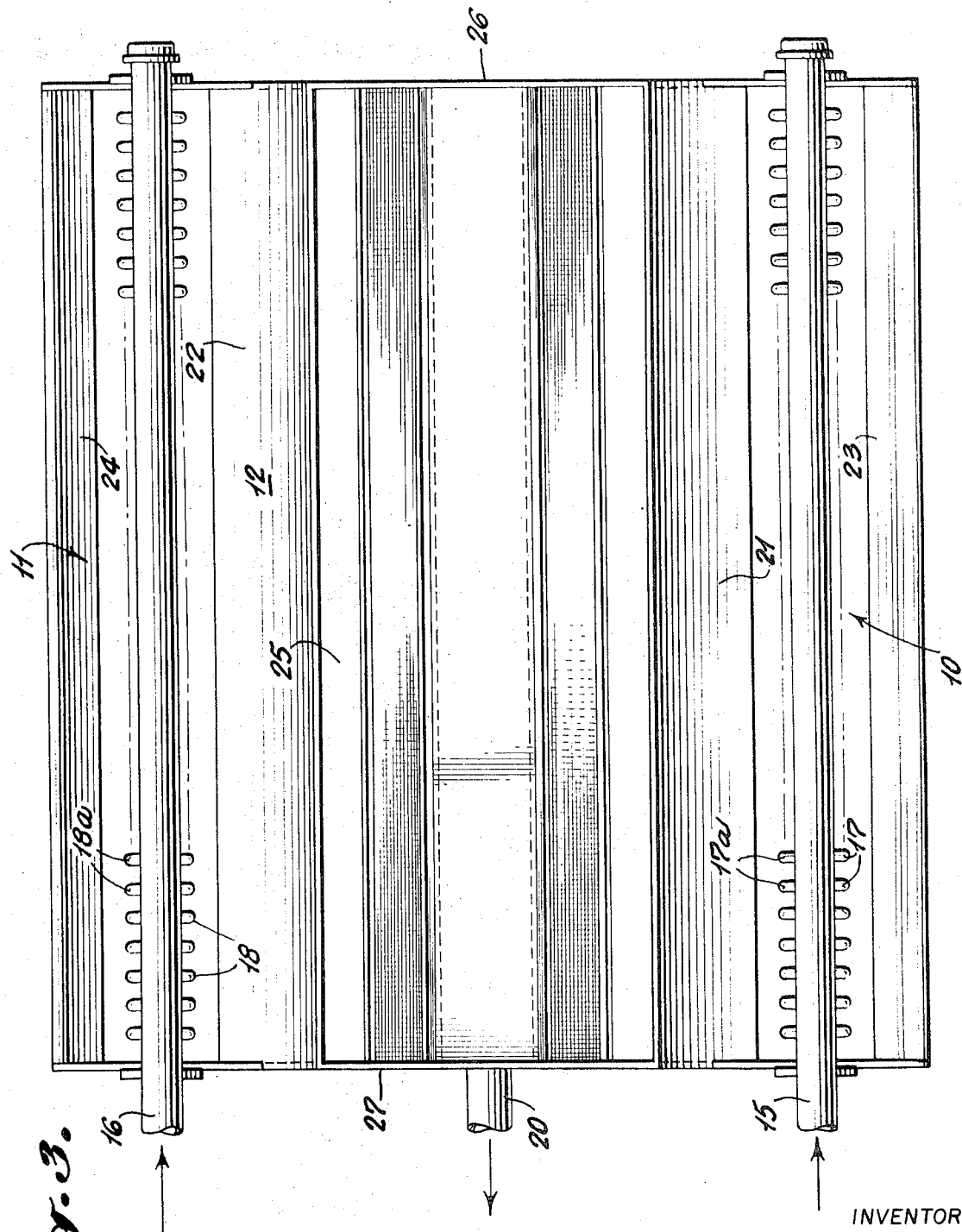

Patented Oct. 23, 1973
3,767,176
6 Sheets-Sheet 4
Fig. 6.
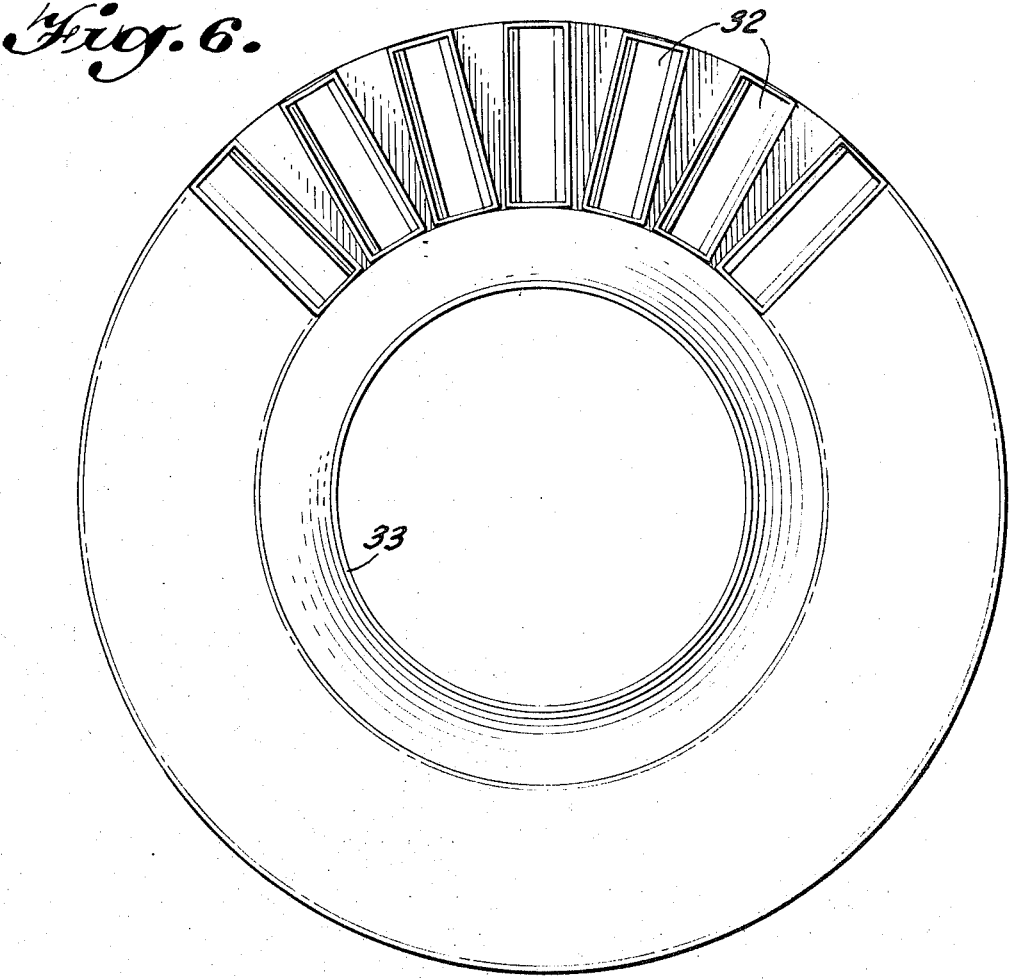
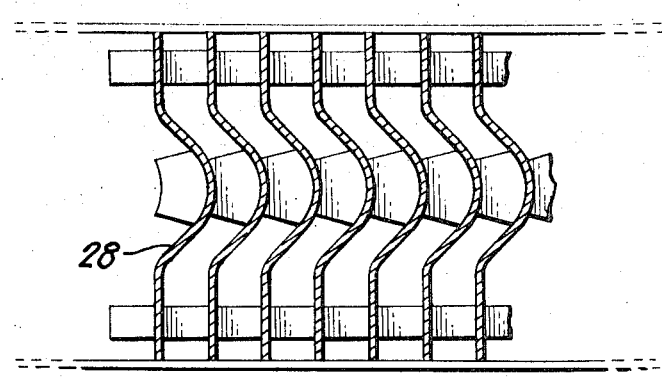
Fig. 4.
INVENTORS
JOHN ENGALITCHEFF, JR.
WILSON E. BRADLEY, JR.
EDWARD N. SCHINNER
BY
Stevens, Davis, Miller & Mosher
ATTORNEYS

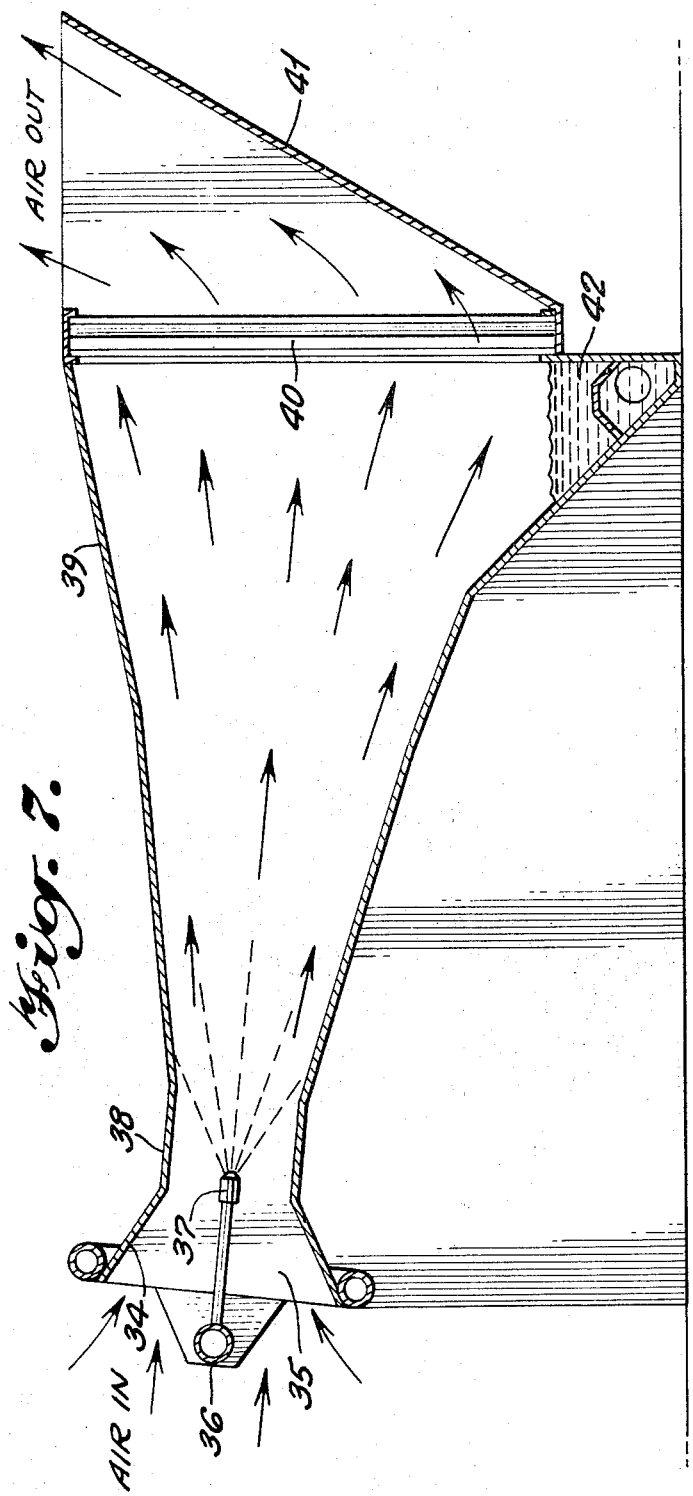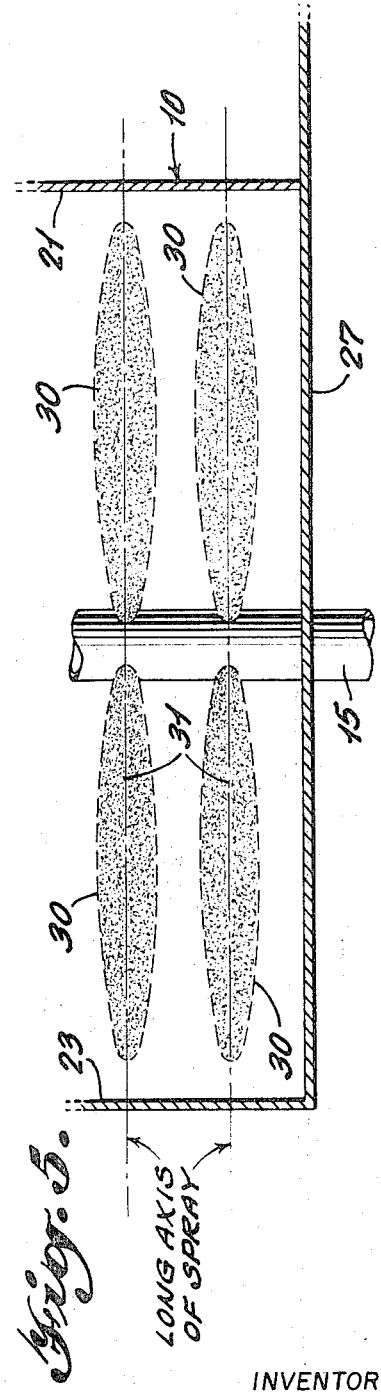

Patented Oct. 23, 1973

INVENTORS
JOHN ENGALITCHEFF, JR.
WILSON E. BRADLEY, JR.
EDWARD N. SCHINNER

BY Stevens, Davis, Miller & Mosher
ATTORNEYS

INJECTOR TYPE COOLING TOWER

This invention relates to a structurally improved evporative heat exchanger of the injection type which constitutes an improvement over the subject matter of the continuation-in-part application of John Engalitcheff, Jr., Ser. No. 826,638, filed May 21, 1969.

In the application above identified there is disclosed the concept of a cooling tower made in the form of an injector so that the water to be cooled functions to pump the air. In the type of construction described there is a large air-water interface and some of the water which pumps the air is evaporated, and the latent heat for this evaporation is extracted from the remainder of the water which is then collected in a sump on the exhaust side of the injector. The evaporated water saturates the air and this air bearing the extracted heat is exhausted to atmosphere through a stack.

An object of the present invention is to provide an evaporative heat exchanger of the injector type the components of which are so located and contoured as to cause the through put ratio of pounds of air to pounds of water to be at maximum, the relative velocity between the injected water and induced air to be large, and the area of water-air heat exchange surface to be large, thus resulting in high overall efficiency coupled with economy of construction and operation.

While application Ser. No. 826,638 discloses arrangements in which several stacks serve a single injector and in which a single stack serves several injectors, it has been discovered as a part of this invention that the injectors and stacks may be so contoured as to have common walls resulting in savings in materials of construction and reduction in the amount of floor space required for a given cooling tower.

It is therefore an object of this invention to provide injector type cooling towers which are easy to make and are characterized by extremely compact construction.

A further object of this invention is the use of noncircular injectors for the purpose of improving the compactness of the equipment.

It has been discovered, as a part of this invention, that the axis of flow of the liquid and air can be non-vertical or vertical but inverted to accommodate to a wide variety of space requirements.

Other objects and advantages of this invention will be apparent upon consideration of the following detailed description of several embodiments thereof in conjunction with the annexed drawings wherein:

FIG. 2 is a view in section taken on the line 2—2 of FIG. 1;

FIG. 3 is a top plan view of the cooling tower shown in FIG. 1, the spray from the nozzles being omitted for convenience of illustration;

FIG. 4 is a fragmentary view in section taken on line 4—4 of FIG. 1 and illustrating the mist eliminators incorporated in that piece of equipment;

FIG. 5 is a view in section taken on line 5—5 of FIG. 1;

FIG. 6 is an arrangement showing a large number of injectors of the slotted throat type arranged to serve a common stack in a large, very high capacity unit;

FIG. 7 is a modified injection-type cooling tower in which the spray nozzles eject water generally horizontally.

Figure 1:
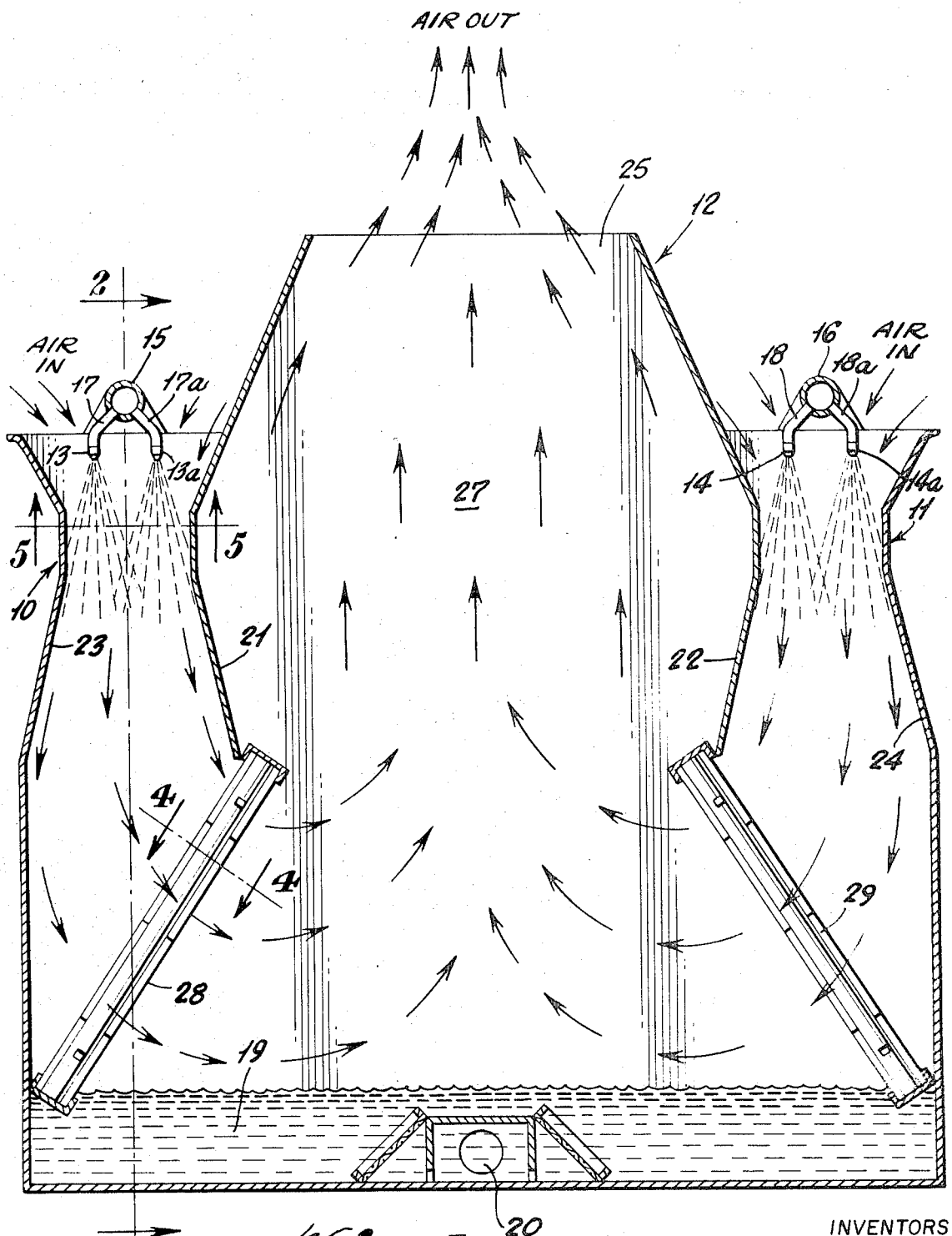
FIG. 1 is a view in vertical section of an injection type cooling tower designed in accordance with the present invention, the throats of the injectors being in the form of elongated slots and the inner wall of the injectors partially defining a common exhaust stack.

Before referring in detail to the drawings, it is well to note that in injection type cooling towers according to the present invention, the water to be cooled is sprayed into a venturi. This water draws great quantities of air into the mouth of the venturi. The air and water move relative to one another and the magnitude of relative movement is great. Mixing and turbulence create large air water contact areas. The total effect is one of excellent heat exchange. This causes some of the water to evaporate, getting its heat of vaporization from the rest of the water, and so transferring the heat load from the water to the air. The cooled water is collected for use and the saturated heat-loaded air is vented to atmosphere while recirculation is prevented.

Referring now in detail to FIGS. 1 to 4, inclusive, the cooling tower there shown is comprised basically of two venturies 10 and 11 arranged on opposite sides of a common stack 12. The venturies 10 and 11 are not circular in cross section, however, but are elongated so that the cross section of the throat of each venturi is a long narrow rectangle. See in this regard FIG. 3. Two rows of nozzles 13 and 13a are positioned to spray water into venturi 10. Two more rows of nozzles 14 and 14a are similarly positioned to spray water into the venturi 11. A water supply pipe 15 serves the nozzles 13 and 13a and a similar pipe 16 serves the nozzles 14 and 14a. The nozzles 13, 13a, 14, and 14a are supported from and connected to the respective water supply pipes 15 and 16 by intermediate connecting conduits 17, 17a, 18, and 18a, respectively. The row of nozzles 13a serving venturi 10 is shown in FIG. 2. The arrangement shown is, however, followed in the positioning of the nozzles 14 and 14a in the venturi 11.

The construction of the unit of FIGS. 1, 2, 3, 4, and 5 is one designed to save material and to produce a unit not only having small height requirements but also small floor area requirements. To this end, the outer walls of the venturies 10 and 11 are continued downwardly below the discharge end of the venturi partially to define a pan section or sump region 19. The sump region 19 has the usual discharge facilities 20 and will, of course, contain makeup and overflow facilities, not shown.

The inner walls 21 and 22 respectively of venturies 10 and 11 partially define the side walls of the stack 12. The outer walls 23 and 24 thereof continue downwardly to define the left and right walls of the pan or sump region 19. Beyond the top of the respective venturies 10 and 11 the walls 21 and 22 continue upwardly to define tapering sides of the mouth 25 of the stack 12. At opposite ends of the cooling tower there are vertical walls 26 and 27. These walls define the ends of both venturies, the ends of the stack 12, and the ends of the sump 19, see FIG. 3.

The lower divergent portion of each venturi, of course, functions as a diffuser. Their height above the water in sump 19 determines the velocity of the air as it turns to enter the stack 12. If, in order to reduce overall height of the equipment the distance of the lower end of the diffuser portion of the injector above the water in the sump is reduced to a minimum, the turning velocity of the air will be high. It is then necessary to use mist eliminators to prevent entrainment of water into the air exhaust region. In FIG. 1 there are shown two banks of mist eliminators 28 and 29 which run for the full length of the unit. Note that the water level in the sump seals the bottom of eliminators 28 and 29. The shape of these eliminators can be seen by reference to FIG. 4. The shape and location of the mist eliminators 28 and 29 is of considerable importance. As can be seen in FIG. 1 they lie directly vertically below the nozzles 13, 13a and 14, 14a respectively and consequently directly intercept the water spray. The surfaces of the eliminators 28 and 29 become coated with water and remain water loaded during operation of the equipment. The air flow across the water loaded surfaces causes evaporation enough to make a significant contribution to the total heat exchange. These members 28 and 29 also serve to remove mist from the water-air mixture which impinges upon them so that the air escaping from the stack at the mouth 25 is substantially free of entrained droplets. The tendency of the warm saturated air to rise and the tapering of the stack 12 together promote a high velocity discharge from the mouth 25. This tends to prevent air recirculation and, in fact, the high velocity air leaving a stack such as is shown in FIG. 1 actually has the beneficial effect of drawing fresh air adjacent to the upper or inlet mouths of the venturies which are located below the plane of the top 25 of the stack 12.

While application Ser. No. 826,638 shows solid conical sprays used in ejectors of circular cross section with which they work very well, it has been found that sizeable increases in capacity can be achieved in ejectors of rectangular cross section by using nozzles that will discharge their spray in a flat, fan-shaped pattern. These spray patterns are shown in FIGS. 1 and 5. It can be seen that the overall shape of the spray pattern is somewhat like a hand fan, i.e., the long dimension is great in comparison to the width. It has been found that best results are achieved if sprays of the type of FIGS. 1 and 5 are used in side-by-side rows in the relationship depicted in FIG. 5. As shown best in FIG. 5, these sprays are arranged with the long axes 31 of the pattern 30 parallel to each other and to the end walls 26 and 27 of the venturi. The nozzles are so arranged in two rows that the long axes 31 of sprays in adjacent rows are aligned transversely of the venturi, i.e., from wall 21 to wall 23, see FIG. 5. The spacing of adjacent spray patterns both normal to and along the long axes 31 is such as to cause the sprays to merge in the throat region of the venturi. Multiple rows of this type are found to improve heat transfer efficiency. For instance, greater cooling capacity would be realized in a unit with a throat 2 feet wide by 5 feet long using two rows of nozzles than a unit of equal area with a throat 1 foot wide by 10 feet long using one row of nozzles. This improvement in heat transfer is attributed to the intermixing of the spray "cones" as well as better transfer to the air of the available downward water momentum by reducing the percentage of water running down the sidewalls. The width of the throat, however, determines the practicality of the number of rows. The reason for this is clear. If one covers a rectangular area with a conical spray, the diameter of the spray must equal the diagonal dimension of the area to be covered. The diameter of the spray is thus oversize for the short dimension of the rectangular area so that much of the downward water pumping energy is lost by impingement on the sidewalls. Further efficiency is lost because this water which flows wastefully down the sidewall of this injector does not mix with the air in these regions.

Another item discovered is that the nozzles must be oriented 90° to the particular throat sidewalls that are just below and connected to the converging inlet walls. This allows the air to distribute evenly along the flat face of the nozzle thereby contacting the maximum water surface area for best heat transfer and energy conversion. In addition, the water spray is expanding in the same direction as the diffuser thereby helping the air to expand more efficiently. Turning the nozzles 90° to this position is undesirable because it tends to make the air channel itself between the first row and the sidewall, thereby starving the center section.

In FIG. 6, there is shown a cooling tower constructed in accordance with the teachings of the present invention which is similar in theory to the arrangement of FIG. 1 but extremely large and intended to handle very large volumes of water per unit time. A plurality of venturies 32 are arranged around a central tapered stack 33. A common sump is provided and mist eliminators are arranged in a path around the bottom of the stack 33 to prevent entrainment of the water from the various injectors. The injectors have rectangular throats and are arranged with the long axes of the injectors radial of the stack 33. The details of construction of the injectors is as described in conjunction with FIGS. 1 to 4, inclusive.

While the ejectors of FIGS. 1 to 5, inclusive, have in common the feature that the water spray is discharged downwardly, it is possible to operate these systems with the water on a generally horizontal axis or vertical but inverted. In FIG. 7 a horizontal water flow arrangement is depicted. The ejector of that figure is generally similar in shape to the one side of the ejector shown in FIGS. 1 to 4, inclusive, except that it is horizontally arranged. There is a flared mouth portion 34 defining a rectangular air inlet at 35, the short dimension of which is shown in FIG. 7. Lengthwise of the air inlet at 35 there extends a water supply pipe 36 from which there extend a line of mutually spaced nozzles 37 arranged centrally of the ejector walls. The ejector also includes a throat portion 38 of rectangular cross section and a diffuser portion 39. The outlet end of the diffuser is provided with mist eliminators 40 and with a wind deflector 41 to prevent natural air currents from opposing the left to right air flow through the ejector as illustrated.

The ejector pictured in FIG. 7 is tilted downwardly at a slight angle in the direction of flow to prevent water from running out of the throat down the inlet and dripping to the floor. The water-air mixture entering the diffuser maintains enough directional energy to expand fully and fill the upper section of the diffuser even though this requires the mixture to travel "uphill."

In the system of FIG. 7 the cooled water is recovered in a sump 42 which forms part of the lower wall of the diffuser portion 39. The usual water make-up and withdrawal systems are included but not illustrated.

Figure 8:
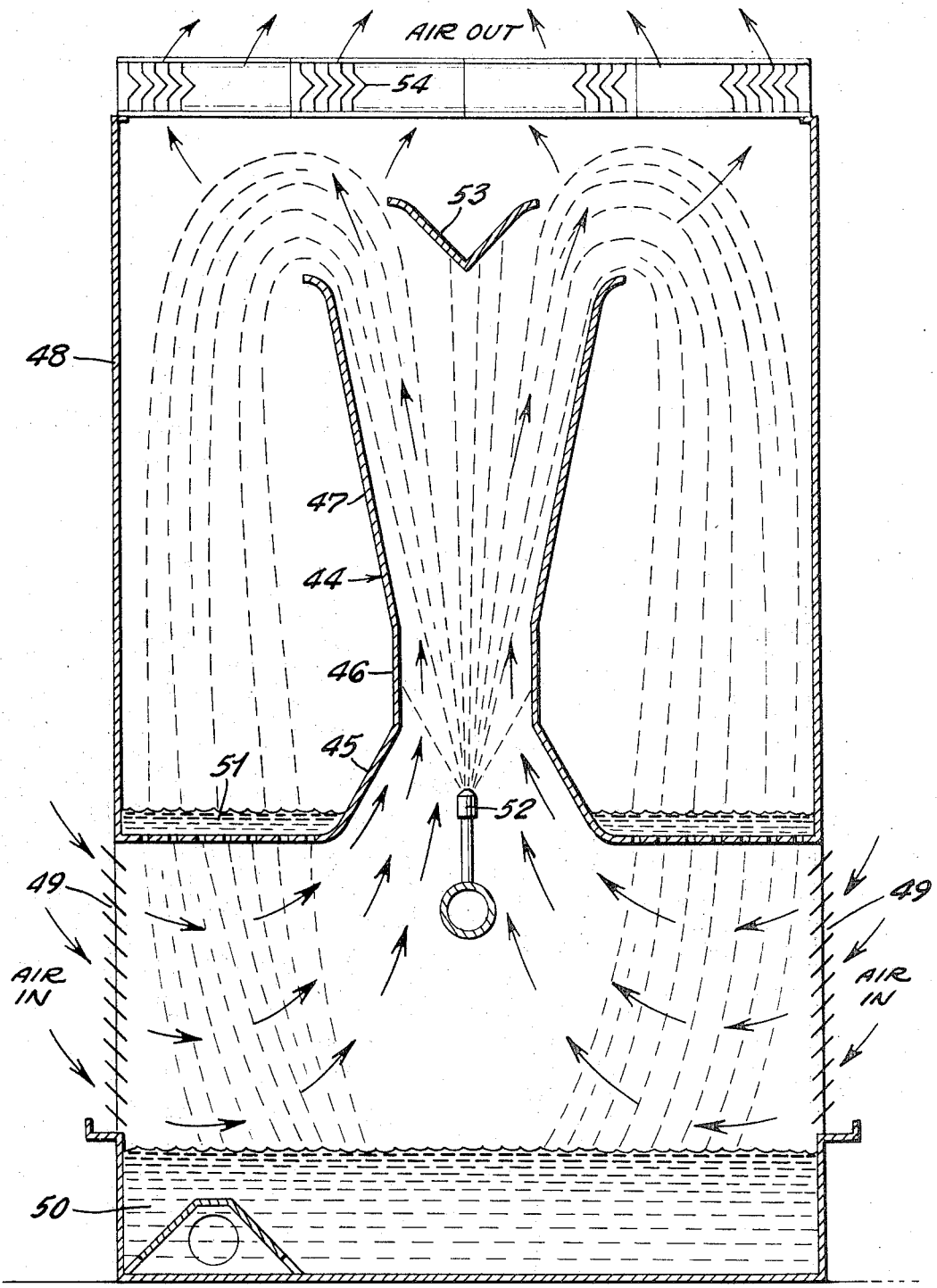
FIG. 8 is a further modified injection-type cooling tower in which the spray nozzles eject water upwardly.

In FIG. 8 the venturi 44 is comprised of a flared inlet portion 45, a throat 46, and a diffuser 47. The venturi 44 is surrounded by a cabinet 48 containing an air inlet 49 between a primary sump 50 and a secondary sump 51. The hot water is injected vertically through nozzles 52 at the inlet 45 of the ejector 44. The water injection induces air flow through the inlet 49 to the venturi where the air-water mixture then travels upwardly through the throat 46, into the diffuser 47 around water deflector plate 53 to the mist eliminators 54 where the remaining water droplets are stripped out of the air. Some of the water will, of course, fall back through the ejector but the deflector plate 53 throws most of the water out to the sides of the cabinet 48 to fall into the secondary sump 51.

The bottom of sump 51 is perforated so that water drains in streams from sump 51 through the incoming air between inlets 49 and mouth 45. Additional cooling is achieved here so that the water temperature in sump 50 is slightly lower than in sump 51. Sump 50 is provided with the usual water withdrawal and make-up fillings, not shown. Since the injector type heat exchanger will operate in vertical and horizontal axes in either direction it is apparent that any axis angle is possible to meet the space requirements of a particular job.

The invention may be embodied in other specific forms without departing from the spirit or essential characteristics hereof. The embodiment and the modification described are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An evaporative heat exchanger comprising injectors, each having a throat of rectangular cross-section, means to spray water into the throat of each injector to induce air flow in great quantities into and through said throat, a water container disposed to receive water issuing from said injectors, a common stack arranged to receive the air issuing from said injectors, said injectors being arranged around said stack, the long axes of the rectangular throat of each injector lying radially of the common stack.

* * * * *

UNITED STATES PATENT OFFICE
CERTIFICATE OF CORRECTION

Patent No. 3,767,176          Dated    October 23, 1973

Inventor(s)   JOHN ENGALITCHEFF, JR.; WILSON E. BRADLEY, JR.; EDWARD N. SCHINNER It is certified that error appears in the above-identified patent and that said Letters Patent are hereby corrected as shown below:

Claim 2 was omitted from the patent and should read as follows: (This is claim 8 in the original specification)

2. An evaporative heat exchanger comprising a pair of injectors each having a restricted throat of rectangular cross-section, means to spray water into each said throat throughout the cross-section thereof and a common tapered central stack between said injectors, and a common water container beneath said injectors and stack, the walls which define the injectors also partially defining the water container, said injectors and said stack having common tapering walls.

On the cover sheet below "Abstract" "1 Claim" should read -- 2 Claims --.

Signed and sealed this 23rd day of April 1974.

(SEAL)
Attest:

EDWARD M. FLETCHER, JR.
Attesting Officer

C. MARSHALL DANN
Commissioner of Patents